July 18, 1939. E. H. SPIEGL 2,166,561
LETTUCE-HANDLING APPARATUS
Filed June 9, 1937 4 Sheets-Sheet 1
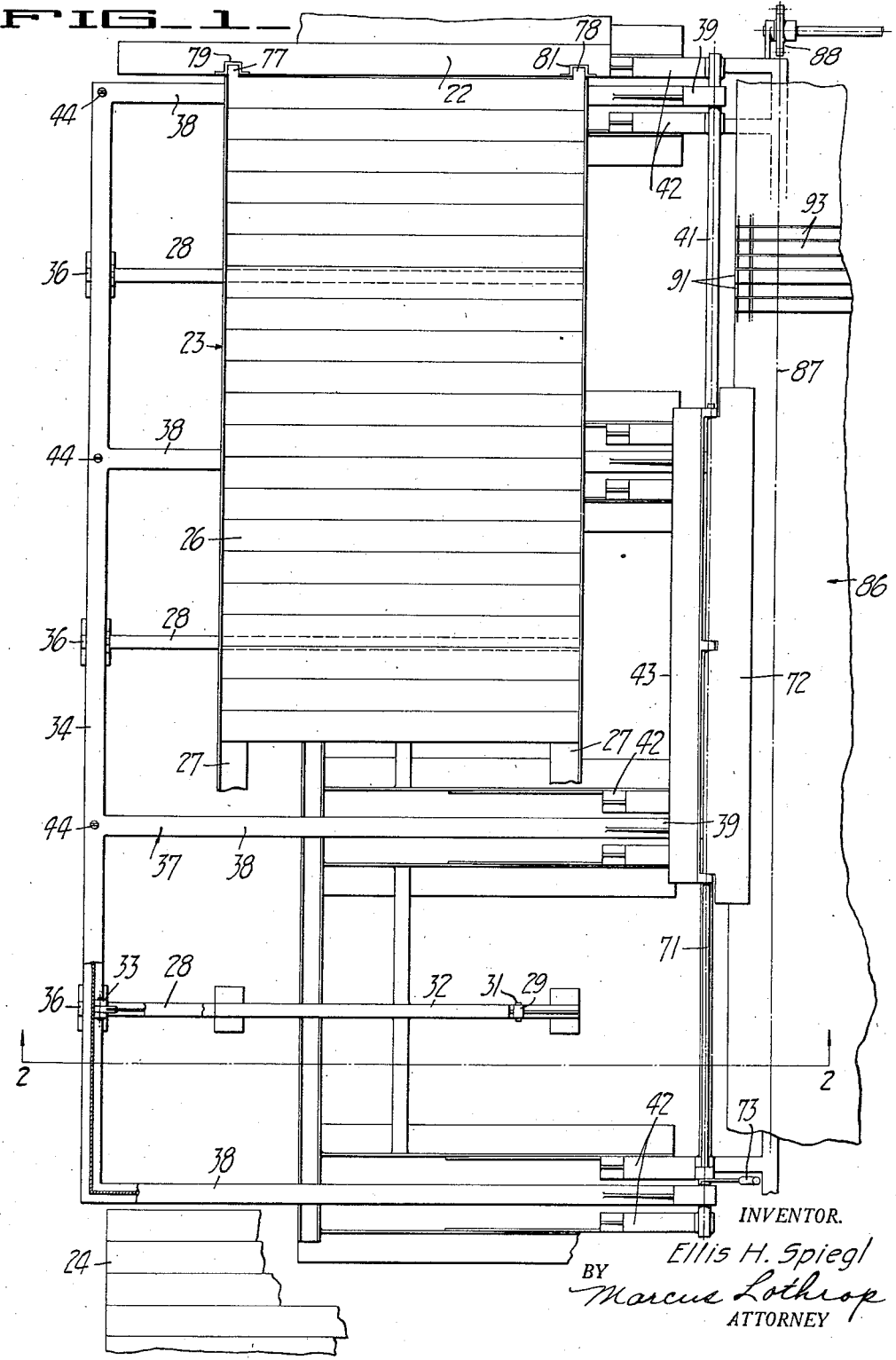
FIG_1_
INVENTOR.
Ellis H. Spiegl
BY Marcus Lothrop
ATTORNEY

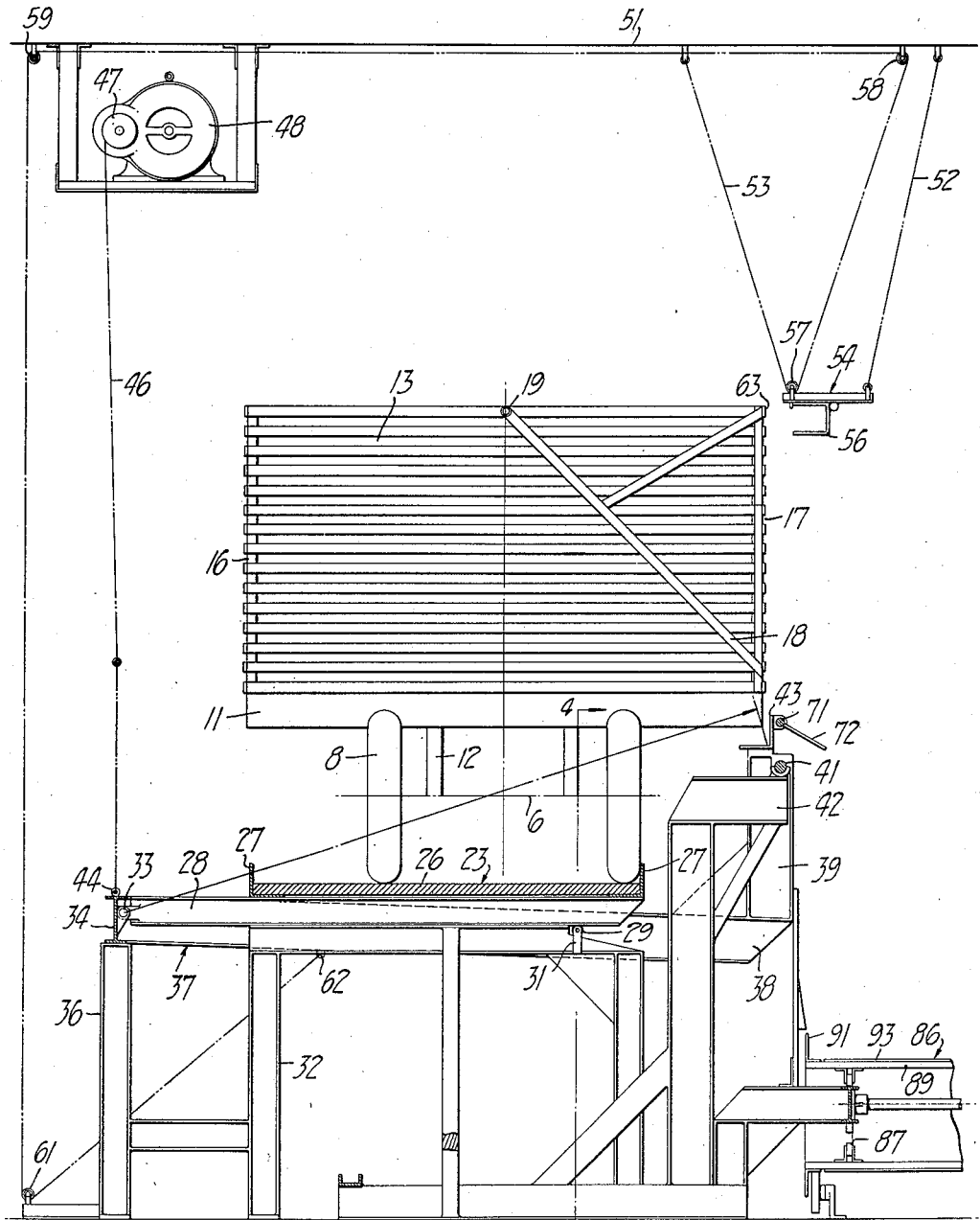

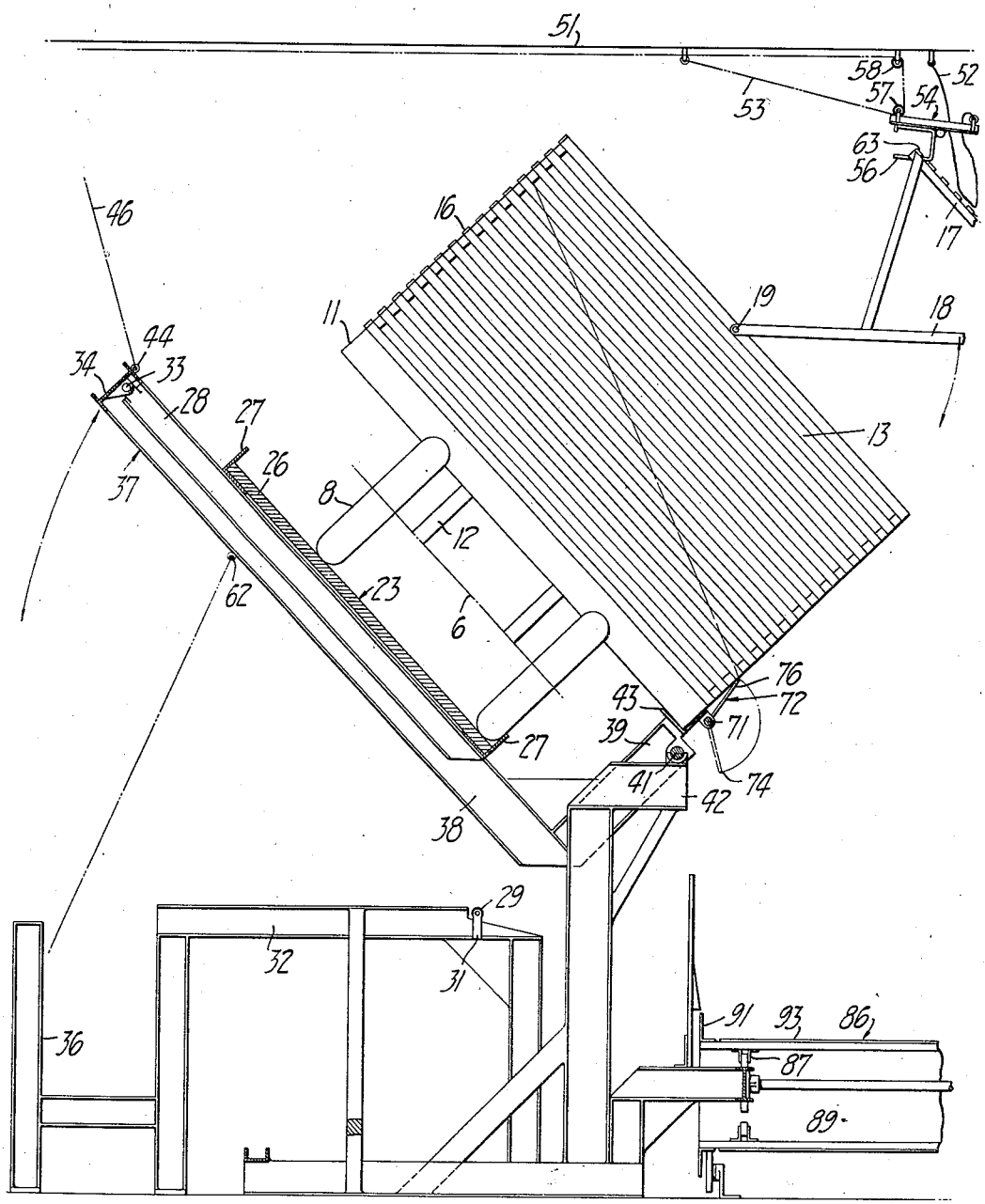

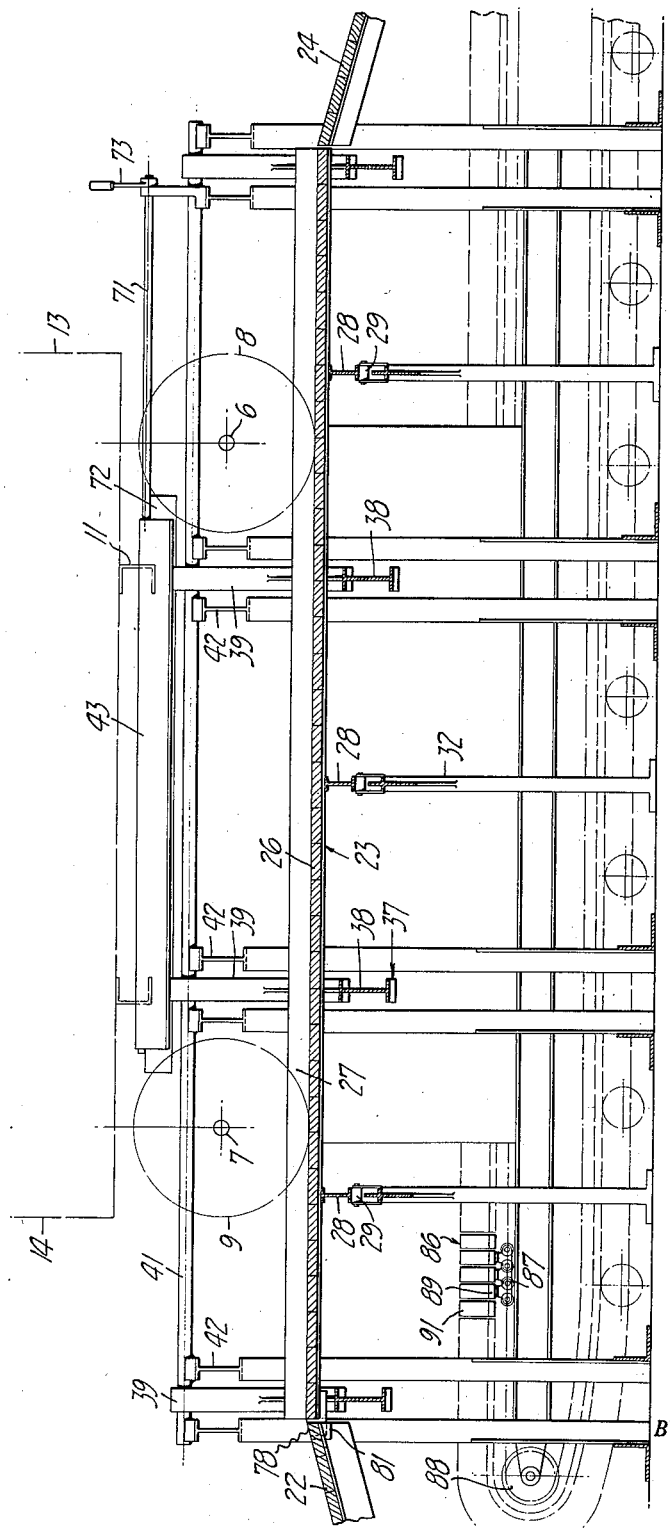

Patented July 18, 1939

2,166,561

UNITED STATES PATENT OFFICE 2,166,561

LETTUCE-HANDLING APPARATUS

Ellis H. Spiegl, Salinas, Calif.

Application June 9, 1937, Serial No. 147,279

3 Claims. (Cl. 214—52)

My invention relates to means for handling lettuce in bulk and in comparatively large quantities, as an incident to the packing of lettuce for shipment. While the apparatus of my invention, either in the precise form disclosed herein or modified, is applicable to a very large number of uses and is by no means confined to operation with lettuce, it is especially useful in connection with such commodity and for simplicity is so described herein.

In the customary gathering of lettuce from the growing field, the lettuce heads in the field are piled at random in a vehicle body and are transported by such vehicle to the packing house. Therein the lettuce is removed from the vehicle for further treatment. The transporting vehicle is often operated over highways as well as in the lettuce fields and the packing house, and customarily comprises a suitable bed supported by springs upon ground-engaging wheels. The vehicle bed, when empty, is several inches higher from the ground than when the vehicle is loaded, due to the compression of the interposed springs, and also due to the compression of the tires if the vehicle is equipped with pneumatic tires.

It is an object of my invention to provide a means for unloading a vehicle despite variations in height of the vehicle bed from the ground.

Another object of my invention is to provide means for handling large quantities of lettuce at one time.

A further object of my invention is to provide means for discharging a large load of lettuce with reasonable uniformity.

A still further object of my invention is to provide means for handling lettuce in large quantities with only a small amount of damage to the lettuce.

The foregoing and other objects of the invention are attained in the embodiment illustrated in the drawings, in which—

Fig. 1 is a plan of a lettuce handling apparatus in accordance with my invention, portions being broken away to disclose the supporting construction.

Fig. 2 is a cross-section the plane of which is indicated by the line 2—2 of Fig. 1.

Fig. 3 is a view comparable to Fig. 2 but shows the lettuce handling apparatus in discharging position.

Fig. 4 is a cross-section the plane of which is indicated by the line 4—4 of Fig. 2.

In its preferred form, the lettuce handling apparatus of my invention contemplates the use of a vehicle having wheels, a body and a movable side on the body, and incorporates a frame on which a body abutment is movably mounted, with a platform mounted on the body abutment to support the vehicle wheels, all combined with means for moving the abutment and the platform in such a way as to transfer the weight of the vehicle body from the wheels to the body abutment while inclining the body, so that when the movable side is lifted the contents of the vehicle body are gravitally discharged.

The vehicle which is utilized to haul the lettuce preferably includes a forward axle 6 and a rearward axle 7, on which ground-engaging pairs of wheels 8 and 9, respectively, are mounted. The wheels are preferably provided with pneumatic tires which are subject to some deflection under load. Between the axles 6 and 7 and the bed 11 of the vehicle body are springs 12 which also are subject to deflection under load, so that the bed 11 of the vehicle body is situated closer to the ground when loaded than when empty.

The body 11 is fabricated in any suitable way, preferably of channels and angle irons welded to form a relatively strong and rigid base. On the bed 11 are erected ends 13 and 14 and a side 16 of uprights and slats, to provide an enclosure. The other side of the vehicle body is formed by an upright and slat arrangement 17 adapted to be raised out of closed position, and consequently having support arms 18 at opposite ends thereof, which are mounted on pivots 19 projecting from the ends 13 and 14. The side 17 can be raised in an arc about the center of the pivots 19 to release the load and can be returned to initial position to continue the enclosure of the body.

A vehicle such as described is loaded with lettuce heads in the field and is brought by a tractor or other suitable device into proximity with an unloading mechanism. The tractor and vehicle approach the unloading mechanism over an inclined ramp 22, and the tractor continues over a platform 23 and comes to rest on a down-ramp 24 with the vehicle approximately in the position shown in Fig. 4. In this position the tractor is temporarily disconnected from the vehicle. The platform 23 comprises a suitable floor 26, secured to a base 27 in turn supported by transversely extending platform beams 28. In the position of the structure shown in Fig. 2, the beams 28 at one end rest upon rollers 29 supported by brackets 31 forming part of the main frame 32 of the structure. This main frame is suitably fabricated of angles and channels, preferably welded together. The other end of each of the beams 28 is connected by a pivot pin 33 to a longitudinal beam 34 resting, in the position shown, on uprights 36 incorporated in the framework 32.

The longitudinal beam 34 itself is secured to an auxiliary frame 37, including transverse beams 38 and upright members 39 which are connected by a pivot shaft 41 to brackets 42 incorporated in the framework 32. Also included in the auxiliary framework 37 is a body abutment 43, preferably comprising a suitable angle iron running longitudinally of the frame and connected to the uprights 39. Connected to the beam 34 by a suitable fastening 44 is a cable 46 leading to a drum 47 driven by a suitable source of power 48, such as an electric motor, under the control of the operator of the structure.

When the vehicle is disconnected from its tractor, in the position shown in Fig. 4, the wheels 8 and 9 on one side of the vehicle are substantially in abutment with one of the angle irons 27 or are spaced but a slight distance therefrom since the tread of all of the vehicles using the apparatus is standard. The side 17 of the vehicle body is consequently very close to a given location over or above the angle iron 43; but the height of the vehicle bed 11 above the angle iron 43 varies in successive vehicles, due to inflation differences in the tires, the weight of the loads on the vehicles, and possibly individual variations in vehicle construction and spring set.

But when the motor 48 is energized, the cable 46 is effective to lift the beam 34 and the auxiliary framework 37, which rotates them about the axis of the pivot shaft 41 with respect to the main frame 32. As the beam 34 moves in an arc about the center of the shaft 41, it correspondingly lifts the pivot 33 in a similar arc, but the other end of the beams 28, being in contact with the rollers 29, simply rests upon such rollers until such time as the uppermost portions of the beams 37 abut the lower faces of the angle irons 27 to lift the platform 23 as a unit with the auxiliary frame 37. During the initial lifting movement of the beams 34, therefore, the beams 28 are moving in an arcuate path about the axis of the pivot pins 33 as a center with respect to the auxiliary frame 37. This necessitates movement of the vehicle bed 11 about a similar center, so that the lower edge of the vehicle bed near the abutment angle 43 moves in a similar arc and is nested in such angle. The weight of the vehicle bed and its contents therefore comes upon the angle 43, there being sufficient vertical movement between the platform 23 and the auxiliary frame 37 so that all vertical clearances are absorbed and practically no weight rests upon the wheels 8 and 9 nearest the angle iron 43, and whatever transverse adjustment is necessary to cause the side of the bed to nest within the angle 43 is afforded by the flexibility of the tires 8 and 9.

Further upward movement of the cable 46 rotates the platform 23 and the auxiliary frame 37 as well as the body abutment 32, as a unit or simultaneously about the axis of the shaft 41, from the position shown in Fig. 2 substantially into the position shown in Fig. 3. In this latter position, the bed 11 of the vehicle is inclined at such an angle that all of the contents thereof can be discharged gravitally.

In accordance with my invention, I provide means for automatically releasing the load on the bed 11 as the vehicle is being tipped. To this end, I suspend from the ceiling 51, by a suitable means such as cables 52 and 53, a frame 54 carrying a plurality of hooks 56 thereon. The cable 53 is preferably passed around pulleys 57, 58 and 59, and is also passed around pulleys 61 to be fastened to a suitable point or device 62 on the auxiliary frame 37. As the vehicle moves in an arc about the axis of the shaft 41, the upper slat 63 on the side 17 moves arcuately into engagement with the hooks 56. This occurs while the cable 53 is being drawn so that the frame 54 is being lifted and tipped. The side 17 is consequently moved in an arc about the axis of the pivot 19 to an out of the way position as shown in Fig. 3. When the vehicle is restored to its original position, reverse movements take place, and, just prior to restoration of the vehicle to its horizontal location, the side 17 disengages from the hooks 56 and the lifting mechanism is ready for a successive operation.

In the event that it is desired to have a relatively uniform discharge of lading from the vehicle body 16, despite the particular manner of tipping the unloading device, I preferably mount on a rotatable shaft 71 a board or barrier 72 which is operable by a handle 73 at one end of the platform 23, between a lower position, as indicated by the dotted lines 74 in Fig. 3, and an upper position, indicated by the lines 76 in Fig. 3. If, when the vehicle is first being tipped and the side 17 is first being raised, the barrier 72 is placed in its upper position 76, then approximately half of the load is held in the vehicle body and is not released until the barrier is rotated into the lower position indicated by the lines 74. In the latter position the inclination of the vehicle bed 11 is sufficient to discharge all of the lading from the vehicle body.

When the vehicle has been completely emptied, the motor 48 is reversed to lower the parts into their original positions, with the platform 23 supported through the beams 28 on the rollers 29 and the pivot pins 33 in a substantially horizontal position. The tractor is again engaged to the vehicle and the vehicle is pulled off the platform and a successive vehicle is placed thereon for unloading. So that the tractive effort of the tractor when operating on the platform will not place excessive strains upon the supporting mechanism, I preferably provide the rear of the platform frame 23 with a pair of projections 77 and 78 which, when the platform is in its Fig. 2 position, engage rather tightly with complementary sockets 79 and 81, respectively, projecting from the ramp 22 and the main frame thereof. Since this interlock between the members 77 and 78 and 79 and 81 is relatively tight, the platform cannot partake of any reactive movement.

Produce which is discharged from the vehicle over the side of the main frame 32 preferably falls upon a conveyor belt 86 made up of chains 87 trained around suitable sprockets 88 and having fastened thereto cross slats 89 with angle irons 91 thereon to form sides. The slats are likewise surfaced with strips 93 of shock-absorbing material, such as sponge rubber, so that produce falling thereon is not damaged by bruising. The conveyor carries the produce to further processing mechanisms and is preferably driven at such a speed with respect to the time necessary for discharge of successive vehicles, and with such relationship to the operation of the barrier 72, as to provide on the conveyor a substantially uniform layer of produce for further processing.

In accordance with the described arrangement, loaded vehicles are, despite variations in loading and height from the ground, brought into engagement with a handling apparatus which transfers the weight of the vehicle from the ground-engaging wheels to the apparatus and then tips the vehicle to such an angle that its contents can be discharged gravitally when the side of the vehicle is automatically moved to a releasing position. Further means are provided for regulating the discharge of produce from the vehicle to a conveyor belt which carries the discharged produce to a point for further processing. When the vehicle has been emptied it is restored to its original position with the sides in location and can quickly and easily be engaged by a propelling device for further use.

I claim:

1. Lettuce-handling apparatus for use with a vehicle having wheels and a body including a bottom depressible with respect to said wheels, comprising a platform for supporting said wheels, an abutment having a horizontal portion, means for moving said platform away from said abutment to deposit the bottom of said body upon said abutment and to divide the load in the direction of said wheels between said abutment and said wheels, and means for moving said platform and said abutment in unison to tip said vehicle.

2. Lettuce-handling apparatus comprising a frame, an L-shaped body abutment mounted for rotation upon said frame, a platform mounted for rotation upon an extension moving with said body abutment, and means on said frame for abutting and supporting said platform.

3. Lettuce-handling apparatus comprising a frame, an L-shaped body abutment mounted for rotation upon said frame, a platform mounted for rotation upon an extension moving with said body abutment and adapted in one position to rest upon said extension and in another position to rest upon said frame, and means for rotating said body abutment and said extension.

ELLIS H. SPIEGL.